the personnel will be afforded a chance to survive.

UNITED STATES PATENT OFFICE 2,389,719

SHARK REPELLENT

Alfred Dinsley, La Canada, Calif.

No Drawing. Application July 7, 1944,
Serial No. 543,974

3 Claims. (Cl. 167—22)

This invention relates to new and improved methods of protecting personnel forced down or cast away at sea from attacks by carnivorous fish such as sharks, barracuda and the like. Such personnel forced down or cast away at sea often use life-rafts or other life-preserving apparatus and as they may be exposed to attacks by sharks, barracuda and the like it is very dangerous to shoot such attackers because the spilling of blood would attract packs of carnivorous fish. To carry my invention into effect, to quote one example within the spirit of the invention, I take 90% strength formic acid and intimately mix said formic acid with finely ground asbestos or other suitable filler until a firm mass is obtained. This mass may be used as produced or it may be dried and comminuted and packed into suitable containers such as nylon mesh fabric, or into containers which are varnished to protect them from the effects of contact with the formic acid, said containers may be perforated or so prepared as to permit free dispersion of the formic acid-asbestos mixture into the sea.

The action of the chemical compound when dispersed in sea water is to attack the organs of respiration of the fish, particularly the membraneous laminae, gill-arches and gill-slits and will quickly deprive said organs of respiration of their natural glutinous coating with the result that the entire gill-apparatus will become hardened and will not function. A fish so affected will promptly leave for areas remote from the locale where the chemical dispersion occurs, and thus the personnel will be afforded a chance to survive.

Formic acid is the first member of the fatty acids in the paraffine series and is readily soluble in sea water. Other acids in the same group which are readily soluble in sea water may be used effectively as a repellent within the spirit of my invention to cause carnivorous fish to leave areas where the chemical dispersion is applied.

The containers may be made of substances of animal, vegetable or mineral origin and will be provided with a float of wood, plastic, kapok, cork or other material calculated to suspend the dispersal container at comparatively surface or near the surface level of the sea. Each float and dispersal container will constitute a unit and several units may be carried by personnel, together with the usual signalling devices.

Having now described my invention what I claim is:

1. The method of repelling carnivorous fish from cast aways in carnivorous fish infested water comprising dispersing formic acid in said water.

2. The method of repelling carnivorous fish in a body of fish infested water comprising dispersing formic acid in said body of water in quantities capable of attacking the organs of respiration of said fish.

3. The method of repelling carnivorous fish in infested sea water comprising dispersing formic acid capable of attacking and causing disfunctioning of the gill apparatus of the fish in the area of infested water.

ALFRED DINSLEY.